United States Patent Office 2,872,467
Patented Feb. 3, 1959

2,872,467

PREPARATION OF OXALATES OF METALS OF ATOMIC NUMBER GREATER THAN 88

Robert B. Duffield, Champaign, Ill., assignor to the United States of America as represented by the United States Atomic Energy Commission No Drawing. Application December 10, 1948
Serial No. 64,711

10 Claims. (Cl. 260—429.1)

This invention relates to oxalates of metals of atomic number greater than 88 and, more particularly, to a method for the preparation of these compounds. Specifically, this invention teaches a method for the preparation of oxalates of metals such as thorium, plutonium and the like.

Mastick and Wahl, in U. S. patent application, Serial Number 792,834, filed December 19, 1947, now Patent No. 2,833,800, granted May 6, 1958, have demonstrated a method for the preparation of heavy metal oxalates. Their method is directed, however, to the preparation of these compounds from aqueous solutions and, specifically, to the preparation of the plutonium oxalate from solutions of plutonium and oxalate ions.

While plutonium trioxalate is a satisfactory and useful starting product in a scheme for the chemical purification of enriched fissionable materials such as those used in homogeneous reactors and other neutron multiplying systems, a rather cumbersome and time consuming procedure was utilized in the past to achieve the end. Generally, this involved changing the valence state of one or more of the active materials and numerous other chemical manipulations, as for example, extracting, washing, drying and the like. In this procedure as in any chemical process, some of the invaluable materials are subject to loss in the various steps just described. Care must be taken to prevent even small losses of these materials, not only because of their value but also because the radioactive and toxic properties of these materials constitute an extremely hazardous condition for operating personnel.

Fortunately, such losses may be reduced to a negligible amount by the proper care and procedure. Hydrogen peroxide is a very effective agent for use in the recovery of certain radioactive materials, and is particularly useful in the recovery of plutonium from waste solutions and other residues. The precipitation of plutonium as the peroxide gives excellent separation from light element impurities. It is to be pointed out, however, that plutonium peroxide is a difficult material to process. It is insoluble in dilute acids and even cold concentrated nitric acid will not immediately begin to dissolve the peroxide cake. Once the mixture is heated in 5–16 molar nitric acid, the reaction becomes quite vigorous. Large amounts of oxygen are liberated and the solution foams in a manner that requires careful control measures, such as the use of large reaction vessels, ice baths, spray traps, scrubbing towers and the like. The temperature of the reacting mixture must be maintained below 40° C. or uncontrolled foaming will occur, often with explosive violence. Provision must be made for immediate cooling of the vessel if vigorous foaming begins.

After the plutonium peroxide is dissolved, a number of additional steps are necessary to obtain the plutonium in the form of the oxalate which can be readily converted by the proper process into a material suitable for reduction to the metal. The plutonium compound which is formed may be comprised of both plus four and plus six plutonium ions so hydrogen iodide solution, with or without intermediate steps, is added to reduce the plutonium to the plus three valence state and aqueous oxalate solution is introduced into the water extract to precipitate the plutonium as the plus three oxalate. After removing the supernatant and washing the precipitate with the appropriate solutions, the plus three plutonium oxalate is obtained as a greenish-white, crystalline precipitate.

While the foregoing procedure is very effective for obtaining the plus three plutonium oxalate from recovery solutions and residues, it is, nevertheless, a tedious and time consuming method. Since plutonium peroxide is generally obtained as an intermediate product in the recovery method, a substantial saving of time and material could be effected if the peroxide could be converted rapidly to an oxalate.

The present invention contemplates as the primary object, a rapid, efficient, simple method for the preparation of an oxalate of a metal of atomic number greater than 88, in the plus four valence state.

This invention contemplates as another object, a method for the preparation of a substantially purified oxalate of a metal of atomic number greater than 88, in the plus four valence state.

This invention contemplates as another object, a method for the preparation of a purified oxalate of a metal of atomic number greater than 88 from the corresponding metal peroxide.

This invention contemplates as another object, a method for the preparation of thorium oxalate in the plus four valence state.

This invention contemplates as another object, a method for the preparation of purified thorium oxalate from thorium peroxide.

This invention contemplates as still another object, a method for the preparation of plutonium oxalate.

This invention contemplates as still another object, a method for the preparation of purified plus four plutonium oxalate from plutonium peroxide.

Still further objects and advantages of this invention will become apparent to those skilled in the art from the description and examples which follow.

In accordance with the above objects of the present invention, it has been found that a satisfactory method of preparing an oxalate of a metal of atomic number greater than 88 is accomplished in the following described manner.

A peroxide of a metal of atomic number greater than 88 in the non-dissolved state is treated with an aqueous acid solution containing oxalate ion, preferably aqueous oxalic acid solution, to yield essentially a pure, insoluble oxalate of the corresponding metal in the form of large crystals. The reaction probably is as follows in which M is the metal, having a valence of four:

$$MO_4 + 2H_2C_2O_4 \rightarrow M(C_2O_4)_2 + 2H_2O + O_2$$

The reaction is unique in that the metal peroxide appears to remain in the insoluble state during the conversion to a solid metal oxalate.

After completion of the reaction, the products are treated in any manner well-known to those skilled in the arts to eliminate the supernatant, as, for example by filtration, decantation or centrifugation, and to retain the crystallized metal oxalate. The metal oxalate product is obtained in a quite pure form and only a minimum of washing is required after separating the solid metal oxalate from the supernatant. The precipitate may be dried and stored or used wet in further chemical processing.

In the practice of the present invention and as a specific embodiment thereof, the following example will serve to illustrate the method employed in preparing the metal oxalate, and for this purpose, plutonium (element 94) is selected as the example of the metal of atomic number greater than 88.

Example I

Ten grams of plutonium peroxide in the solid state are washed with three 5-milliliter portions of 1 molar nitric acid to remove impurities such as the sulfate ion which may be present as a result of prior chemical processing. The material is then treated with 125 milliliters of aqueous 0.67 molar oxalic acid solution which is sufficient to convert all the plutonium peroxide to plutonium oxalate and to make the supernatant 0.1 to 0.2 molar in oxalic acid. The presence of an excess of acid is thought to result in a more complete metathesis of the peroxide to the oxalate, by reducing the amount of impurities, such as, rare earths, which will precipitate. A 0.15 molar excess of the acid corresponds to a solution having a pH of about 1.5 This heterogeneous mixture is permitted to digest for 3 hours at room temperature. Metathesis of the peroxide to the oxalate during this period results in a large crystalline form of the plus four plutonium oxalate, having an edge of about 22 microns. The supernatant is separated from the precipitate by decanting or other well-known means and the oxalate is washed with a 3.0 molar nitric acid solution containing 0.1 mole oxalic acid to eliminate impurities and to obtain the precipitate in the more desirable form of large, purified crystals. A material balance on the products obtained by this method shows an oxalation yield of 97.4 to 98.0 percent.

From the foregoing example it will be seen that the method of this invention offers numerous advantages in the preparation of pure, crystalline, plutonium oxalate.

The crystalline material formed by this method is very desirable in that it is obtained in practically theoretical yield and is in a form substantially purified from all impurities and ready for further processing or storage. In addition, the size of each individual crystal is considerably larger than is normally obtained by metathesis.

The following example illustrates a method by which thorium peroxide is converted to thorium oxalate. While a relatively small sample is chosen for illustration, the method is adequate for production on a larger scale.

Example II

Ten grams of solid thorium peroxide are treated with 190 milliliters of 0.67 molar oxalic acid solution at room temperature. This corresponds to approximately 50 percent excess of the acid and is sufficient to insure complete oxalation. At room temperature, the reaction is slow to start and a slight application of heat is helpful in initiating the metathesis. Care must be taken to avoid hot spots in the reacting mixture and for this reason, the use of a water bath is desirable. The mixture may be stirred mechanically but air agitation is preferred. In about 90 minutes, the metathesis is complete with a maximum temperature of 62° C. being attained. The mixture is permitted to stand and in about an hour well-defined square plates of thorium oxalate are obtained. The supernatant is removed and the oxalate crystals are washed twice with water and once with water containing oxalate ion. The thorium oxalate obtained after drying to remove the water of crystallization is in the form of white, crystalline plates about 10 microns on an edge and essentially free of all impurities.

Excellent yields of the oxalate are obtained by the method of this invention, being, for thorium oxalate, about 90 percent.

A further advantage of the method for this invention is a definite improvement in the health and safety hazards of this method. The elimination of the rapid decomposition of peroxides in the process decreases the possibility of fire or explosion and losses to such an extent that the need for elaborate equipment such as large reaction vessels, ice baths, spray traps and the like is considerably lessened.

It is pointed out that the method of this invention can most advantageously be used in a scheme for the purification of plutonium and other metals of atomic number greater than 88, thus eliminating a portion of the complicated and hazardous procedure heretofore employed to purify these heavy radioactive materials. As pointed out hereinbefore, a strongly acid solution serves to eliminate the co-precipitation as oxalate of the rare earths which are regarded as being most harmful with respect to slow neutron absorption.

Although the invention has been described in detail as applying to the preparation of plutonium and thorium oxalates, it is equally applicable, with minor modifications, to the preparation of insoluble oxalates of other heavy metals having an atomic number of 89 or above. The process is applicable not only to the natural isotopic mixture of the elements but also to the individual isotopes such as uranium 235, uranium 238, plutonium 238, plutonium 239, and the like.

Since many embodiments of this invention are possible it is to be understood that this invention is not to be limited except as indicated in the appended claims.

What is claimed is:

1. A method for the preparation of heavy metal oxalates which comprises reacting in the solid state a peroxide of a heavy metal having an atomic number greater than 88 with an aqueous acidic oxalate solution to form an insoluble heavy metal oxalate.

2. A method for the preparation of insoluble heavy metal oxalates which comprises contacting in the solid state insoluble peroxide of a heavy metal having an atomic number greater than 88 with an aqueous oxalic acid solution for a period of time sufficient to convert substantially all the heavy metal peroxide to the oxalate, and separating the resulting insoluble lower valent heavy metal oxalate formed from the supernatant.

3. A method for the preparation of thorium oxalate which comprises reacting thorium peroxide in the solid state with an aqueous acid oxalate solution to form insoluble thorium oxalate as large, purified crystals.

4. A method for the preparation of insoluble thorium oxalate which comprises treating insoluble thorium peroxide with an aqueous oxalic acid solution for at least 3 hours at room temperature, and separating solid thorium oxalate from the supernatant in the form of well-defined crystals.

5. A method for the preparation of insoluble thorium oxalate which comprises reacting insoluble thorium peroxide with a 50 percent excess of 0.67 molar oxalic acid solution for a period of time sufficient to convert substantially all the peroxide to the oxalate and separating the insoluble thorium oxalate from the supernatant in the form of well-defined homogeneous crystals.

6. A method for the preparation of insoluble thorium oxalate which comprises contacting 10 grams of thorium peroxide with about 190 milliliters of 0.67 molar oxalic acid solution at room temperature, digesting the mixture for at least 3 hours to obtain the insoluble thorium oxalate substantially free of contaminating impurities and separating the well-defined homogeneous thorium oxalate crystals from the supernatant.

7. A method for the preparation of plutonium oxalate which comprises reacting plutonium peroxide in the solid state with an aqueous acid oxalate solution to form insoluble plutonium peroxide as large purified crystals.

8. A method for the preparation of insoluble plutonium oxalate which comprises treating insoluble plutonium peroxide with an aqueous oxalic acid solution for at least 3 hours at room temperature, and separating solid plutonium oxalate from the supernatant in the form of large, well-defined crystals.

9. A method for the preparation of insoluble plutonium oxalate which comprises reacting insoluble plutonium peroxide with a 50 percent excess of 0.67 molar oxalic acid solution for a period of time sufficient to convert substantially all the peroxide to the oxalate and separating the insoluble plutonium oxalate from the supernatant in the form of well-defined homogeneous crystals.

10. A method for the preparation of insoluble plutonium oxalate which comprises contacting 10 grams of plutonium peroxide with about 125 milliliters of 0.67 molar oxalic acid solution at room temperature, digesting the mixture for at least 3 hours to obtain the insoluble plutonium oxalate substantially free of contaminating impurities and separating the well-defined homogeneous plutonium oxalate crystals from the supernatant.

References Cited in the file of this patent
UNITED STATES PATENTS 1,526,943    Thews _____ Feb. 17, 1925

OTHER REFERENCES

Accum: A Practical Essay on Chemical Reagents or Tests, p. 68 (1817), publ. by M. Carey & Son, Philadelphia, Pa.